Patented June 28, 1927.

1,633,942

UNITED STATES PATENT OFFICE.

HARRY HEY, OF DEWSBURY, ENGLAND.

PROCESS FOR REMOVING SUSPENDED MATTERS FROM OILS AND ORGANIC SOLVENTS.

No Drawing. Original application filed November 26, 1921, Serial No. 517,875, and in Great Britain December 16, 1920. Divided and this application filed March 11, 1924. Serial No. 698,570.

This invention relates to a process for removing suspended matter from oils and organic solvents and is a divisional on my application No. 517,875 filed on the 26th November, 1921.

The parent application, referred to above, describes a process in which the precipitation of impurities is effected by mixing intimately with the impure hot oil or cold solvent one or a mixture of the following substances:—sulphonated oils; aqueous or alcoholic solutions of sulphonated oils; aqueous or alcoholic solutions of sulphonated oil soaps of potash, soda or ammonia.

The object of the invention is to provide a new precipitating agent and method of using the same for the purpose of removing the very fine suspensions of water and solid matter contained in liquid oils and in volatile organic solvents that have been used in the extraction of oils, greases and waxes from textile materials, bones, seeds and the like, or in volatile organic solvents that have been used in so called dry cleaning processes.

The suspended matter may consist of water or finely divided portions of materials treated for extraction of oil, or materials treated in cleaning processes or in the case of waste lubricating oils of finely divided portions of the materials and combustion products with which they come in contact when in use. This suspended matter ordinarily settles out very slowly and renders the recovery of clean oils, greases and waxes revivified solvent impossible without resorting to centrifuging or distilling.

According to the present invention the material to be treated is intimately mixed with sulphonated oil diluted with a hydrocarbon solvent. The sulphonated oil is produced by the action of strong sulphuric acid on oleic or ricinoleic acid or their glycerol esters or parent oils such as olive oil, castor oil and the like, either separately or mixed together and diluted with a hydrocarbon solvent for oils such as petrol, benzole, toluol, xylol, solvent naphtha or the like or a mixture of these. The product can be used in the acid state or after washing with brine to remove the excess of free sulphuric acid or converted into soaps by neutralizing with aqueous or alcoholic alkali solutions.

The surface tension of the finely divided water is lowered and together with the finely divided solid matter it settles by gravity from the oil or solvent giving a clear liquid and a sludge containing the foreign matters and the excess of reagent liquid used.

The apparatus used for carrying out the operation is fully described and shown in my parent application referred to above and need not therefore be described herein.

I claim:

1. The process of reclaiming a used mineral oil or organic solvent containing suspended matter comprising the steps of mixing a sulphonated unsaturated oil diluted with a hydrocarbon solvent intimately with said mineral oil or organic solvent to be treated and allowing the suspended matter thus precipitated to separate by gravity.

2. The process of reclaiming a used mineral oil or organic solvent containing suspended matter comprising the steps of mixing a sulphonated unsaturated oil diluted with benzole intimately with said mineral oil or organic solvent to be treated and allowing the suspended matter thus precipitated to separate by gravity.

In witness whereof I affix my signature.

HARRY HEY.